United States Patent
Oshima

(10) Patent No.: US 12,375,826 B2
(45) Date of Patent: Jul. 29, 2025

(54) IMAGING APPARATUS AND CONTROL METHOD THEREOF FOR IMAGE CAPTURING ACCORDING TO CHANGE IN SUBJECT IMAGE

(71) Applicant: CANON KABUSHIKI KAISHA, Tokyo (JP)

(72) Inventor: Koji Oshima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 17/576,637

(22) Filed: Jan. 14, 2022

(65) Prior Publication Data

US 2022/0141402 A1   May 5, 2022

Related U.S. Application Data

(63) Continuation of application No. PCT/JP2020/024701, filed on Jun. 24, 2020.

(30) Foreign Application Priority Data

Jul. 19, 2019   (JP) .................................. 2019-134013

(51) Int. Cl.
*H04N 25/50*   (2023.01)
*H04N 25/40*   (2023.01)
(Continued)

(52) U.S. Cl.
CPC ............. *H04N 25/50* (2023.01); *H04N 25/40* (2023.01); *H04N 25/42* (2023.01); *H04N 25/44* (2023.01); *H04N 25/79* (2023.01)

(58) Field of Classification Search
CPC ........ H04N 25/50; H04N 25/42; H04N 25/44; H04N 25/79; H04N 25/46; H04N 25/40; H04N 25/76; H04N 25/707
See application file for complete search history.

(56) References Cited

U.S. PATENT DOCUMENTS

| | | | |
|---|---|---|---|
| 10,957,028 B2 * | 3/2021 | Shibata | G03B 15/00 |
| 2006/0171023 A1 * | 8/2006 | Kishida | G02B 21/365 |
| | | | 359/368 |

(Continued)

FOREIGN PATENT DOCUMENTS

| | | |
|---|---|---|
| CN | 1543742 A | 11/2004 |
| CN | 103475809 A | 12/2013 |

(Continued)

OTHER PUBLICATIONS

International Search Report dated Aug. 25, 2020 of the corresponding International Application, PCT/JP2020/024701.

(Continued)

*Primary Examiner* — Michael E Teitelbaum
(74) *Attorney, Agent, or Firm* — Cowan, Liebowitz & Latman, P.C.

(57) ABSTRACT

An imaging apparatus acquires pixel signals for each region of a plurality of regions obtained by dividing an imaging plane having a plurality of pixels arranged in a two-dimensional pattern and detects a region among the plurality of regions in which a subject image has changed. The imaging apparatus determines an image capturing mode and controls to perform image capturing in the determined image capturing mode in response to the region in which the subject image has changed being detected and to output a captured image. The imaging apparatus determines the image capturing mode by selecting a first image capturing mode or a second image capturing mode based on the region in which the subject image has changed.

10 Claims, 12 Drawing Sheets

(51) Int. Cl.
  *H04N 25/42* (2023.01)
  *H04N 25/44* (2023.01)
  *H04N 25/79* (2023.01)

(56) References Cited

U.S. PATENT DOCUMENTS

2017/0064211 A1* 3/2017 Omid-Zohoor ........ H04N 25/42
2017/0324911 A1* 11/2017 Miyakawa ........... H04N 5/3535

FOREIGN PATENT DOCUMENTS

| CN | 109314749 A | 2/2019 |
| JP | 2005-184689 A | 7/2005 |
| JP | 2006-215260 A | 8/2006 |
| JP | 2014232137 A | 12/2014 |
| JP | 2017108286 A | 6/2017 |
| JP | 2018022935 A | 2/2018 |
| JP | 2018056882 A | 4/2018 |

OTHER PUBLICATIONS

The Sep. 30, 2023 Chinese Office Action, without an English Translation, that issued in Chinese Patent Application No. 202080052178.4.

The Sep. 8, 2023 Japanese Office Action, without an English Translation, that issued in Japanese Patent Application No. 2019-134013.

* cited by examiner

IMAGING APPARATUS AND CONTROL METHOD THEREOF FOR IMAGE CAPTURING ACCORDING TO CHANGE IN SUBJECT IMAGE

CROSS-REFERENCE TO RELATED APPLICATIONS

This application is a Continuation of International Patent Application No. PCT/JP2020/024701, filed Jun. 24, 2020, which claims the benefit of Japanese Patent Application No. 2019-134013, filed Jul. 19, 2019, both of which are hereby incorporated by reference herein in their entirety.

BACKGROUND OF THE INVENTION

Field of the Invention

The present invention relates to an imaging apparatus and a control method thereof for image capturing according to a change in a subject image.

Background Art

Conventionally, an imaging apparatus has been used to observe and monitor a target by using an image. As an imaging apparatus used for such a purpose, there is known to be an apparatus that captures and records frame images at a predetermined time interval and an apparatus that starts imaging and recording in response to detection of a change in a subject image from a difference in luminance values between consecutive frames.

PTL 1 discloses a technique for detecting a change in a subject image by using output obtained by pixel addition in each divided block of an imaging device in a drive mode different from normal image capturing in which imaging and recording are performed, and reducing the information processing volume for image information involving the detection, to reduce power consumption.

PTL 2 discloses a technique for detecting a change in a subject image in images being captured and for performing pixel addition or thinning processing when the detected amount of change is smaller than a predetermined threshold, to reduce the processing load of image processing when a desired amount of change is not detected.

CITATION LIST

Patent Literature

PTL1: Japanese Patent Laid-Open No. 2018-22935
PTL2: Japanese Patent Laid-Open No. 2006-215260

A solid-state imaging device disclosed in PTL 1 transitions from a mode in which signals of a plurality of pixels are added to a normal image capturing mode in which signals of the pixels are output in units of one pixel without addition of the pixels, when a change in the subject image occurs. That is, the solid-state imaging device outputs the image that includes the largest number of signals and is constituted by each pixel after the change in the subject image. Therefore, the output image may be an unnecessarily detailed image as an image for recognizing a subject (for example, the subject image positioned nearby). In the technique disclosed in PTL 1, power consumption can be reduced before the change of the subject image but reduction in the power consumption after the change in the subject image is not considered.

In a microscope system disclosed in PTL 2, detection of a change in a subject image and addition processing are performed by an image processing unit or a pixel-number converter external to an imaging unit (i.e., an imaging device). That is, the imaging unit is always outputting images of a large number of pixel signals, and the reduction of power consumption of the imaging unit itself is not considered.

SUMMARY OF THE INVENTION

An object of the present invention, which has been made in view of the above issues, is to realize a technique that enables reduction of power consumption in operations after detection of a change in a subject image in an imaging apparatus that performs image capturing in response to detection of a change in a subject image.

In order to solve the aforementioned issues, one aspect of the present disclosure provides an imaging apparatus comprising: a detecting unit that acquires pixel signals for each of a plurality of regions obtained by dividing an imaging plane having a plurality of pixels arranged in a two-dimensional pattern, and detect a region among the plurality of regions in which a subject image has changed; a determining unit that determines an image capturing mode; and a controller that controls to perform image capturing in the image capturing mode determined by the determining unit in response to the region in which the subject image has changed being detected by the detecting unit, and to output a captured image, wherein the determining unit determines the image capturing mode by selecting a first image capturing mode or a second image capturing mode based on the region in which the subject image has changed detected by the detecting unit, the first image capturing mode being a mode that outputs an image constituted by pixel signals of a first number of pixels, and the second image capturing mode being a mode that outputs an image constituted by pixel signals of a second number of pixels less than the first number of pixels.

Another aspect of the present disclosure provides a control method of an imaging apparatus comprising: acquiring pixel signals for each of a plurality of regions obtained by dividing an imaging plane having a plurality of pixels arranged in a two-dimensional pattern, and detecting a region among the plurality of regions in which a subject image has changed; determining an image capturing mode; and performing control to perform image capturing in the image capturing mode determined in the determining in response to the region in which the subject image has changed being detected in the detecting and to output a captured image, wherein in the determining, the image capturing mode is determined by selecting a first image capturing mode or a second image capturing mode based on the region in which the subject image has changed detected in the detecting, the first image capturing mode being a mode that outputs an image constituted by pixel signals of a first number of pixels, the second image capturing mode being a mode that outputs an image constituted by pixel signals of a second number of pixels less than the first number of pixels.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodi

13A is a diagram illustrating an example of an imaging device according to a present embodiment implemented by a stacked structure.

Figure 13A:
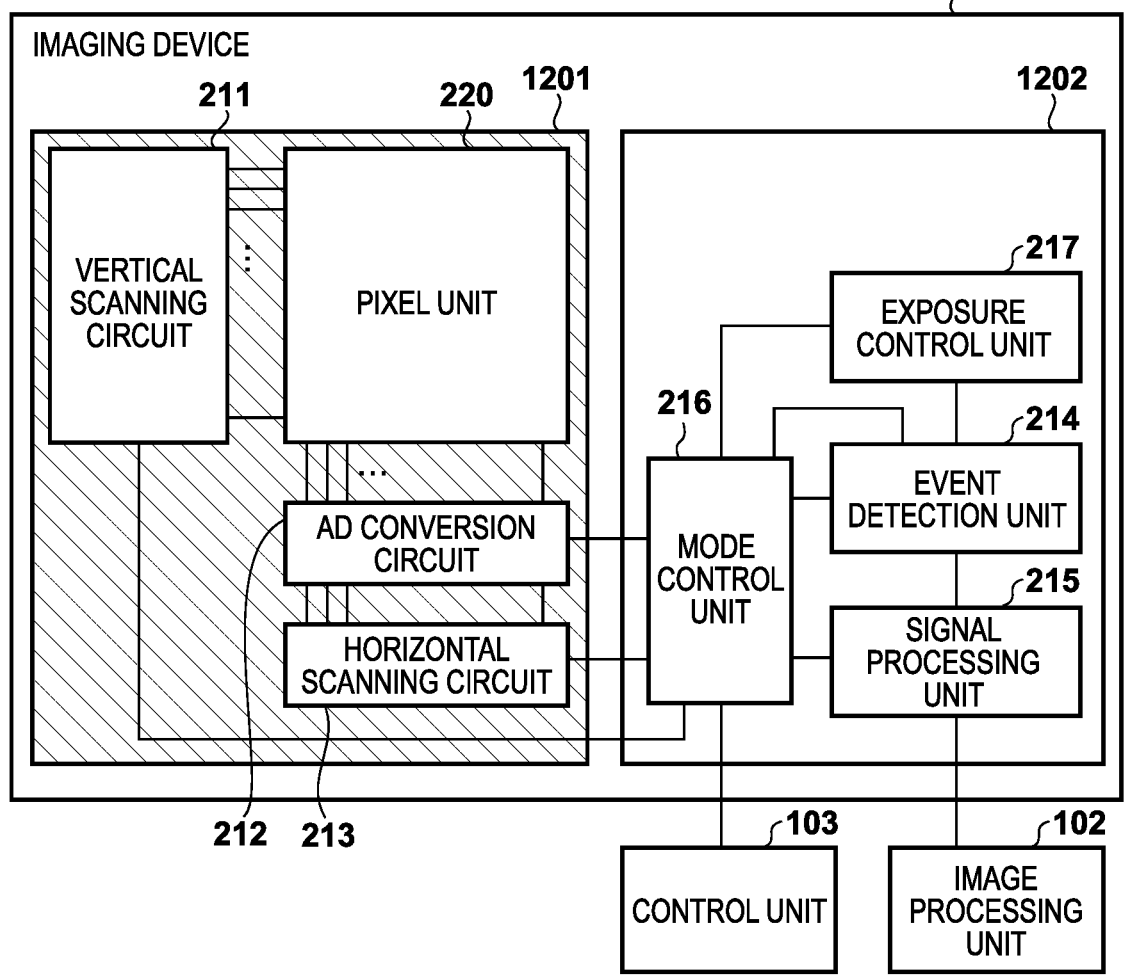
Figure 13B:
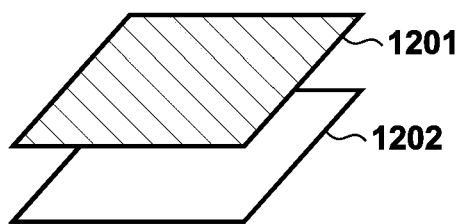

FIG. 13B is a diagram illustrating an example of an imaging device according to a present embodiment implemented by a stacked structure.

Figure 13C:
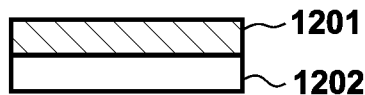

FIG. 13C is a diagram illustrating an example of an imaging device according to a present embodiment implemented by a stacked structure.

DESCRIPTION OF THE EMBODIMENTS

First Embodiment

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Now will be described as an example of an imaging apparatus, an example using a digital camera capable of recording a captured image after detection of a change in a subject image by using an imaging device capable of detecting a change in the subject image. However, the present embodiment is applicable not only to a digital camera but also to other apparatuses capable of recording captured images after detection of changes in a subject image by using imaging devices capable of detecting a change in the subject image. Such apparatuses may include, for example, personal computers, portable telephones including smartphones, game machines, tablet terminals, medical devices, monitoring systems, and in-vehicle systems.

Configuration of Digital Camera

Figure 1:
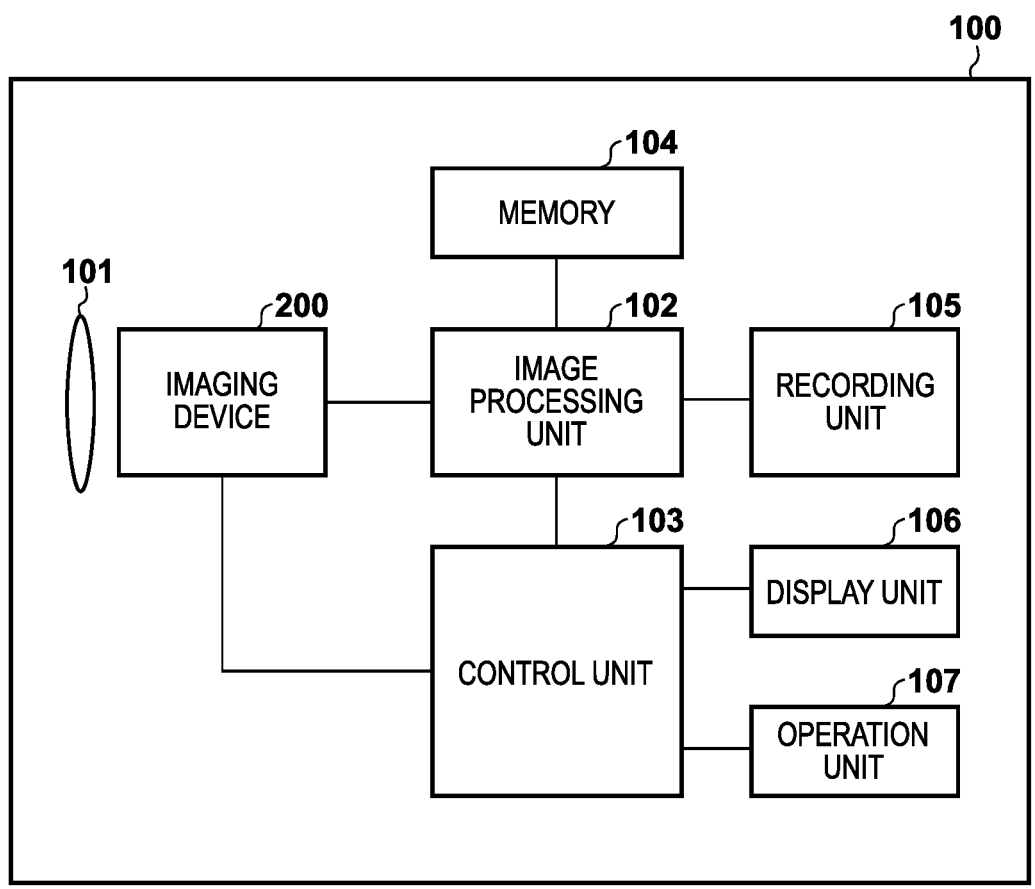
- FIG. 1 is a block diagram illustrating a functional configuration example of a digital camera as an example of an imaging apparatus according to the present embodiment.

FIG. 1 is a block diagram illustrating a functional configuration example of a digital camera as an example of the imaging apparatus of the present embodiment. One or more of the functional blocks illustrated in FIG. 1 may be implemented by hardware, such as an ASIC or a programmable logic array (PLA), or may be implemented by a programmable processor, such as a CPU or an MPU, executing software. Alternatively, they may be implemented by a combination of software and hardware. Therefore, in the following description, even when different functional blocks are described as operation subjects, the same hardware can be implemented as the subjects.

An imaging lens 101 constitutes an image capturing optical system and condenses light from a subject to an imaging device 200. The imaging device 200 includes, for example, a complementary metal oxide semiconductor (CMOS) image sensor, and photoelectrically converts the light incident through the imaging lens 101. The imaging device 200 performs analog-to-digital conversion of the photoelectrically converted signals by an AD conversion circuit described below to output image signals in pixel units. The imaging device 200 has a control function for selecting and changing the drive control of the imaging device 200 itself in accordance with the amount of change in the output values from the internal pixel unit and the detection results of changed regions. The imaging device 200 has, for example, a normal image capturing mode and a detection mode as its operation modes.

In the normal image capturing mode, the imaging device 200 outputs pixel signals as a captured image for recording, whereas in the detection mode, the imaging device 200 selects and changes the image capturing mode from detection of a change in the subject. Although the details will be described below, this control function enables detection of a change in the subject inside the imaging device 200 and control of a suitable image capturing mode in accordance with the change in the subject. The image capturing mode includes, for example, a 4K mode for outputting image signals composed of 3840×2160 pixels and a FullHD mode for outputting image signals composed of 1920×1080 pixels.

An image processing unit 102 performs various types of correction, such as filtering, and digital image processing, such as compression, on the image signals output from the imaging device 200. The image processing unit 102 also performs image processing, such as resizing, in accordance with each mode on the image signals captured in the 4K mode, the FullHD mode, or the like.

A control unit 103 includes, for example, one or more processors, such as a central processing unit (CPU). The control unit 103 comprehensively controls the operation of an entire digital camera 100 including the image processing unit 102, the display unit 106, and the like by loading and executing programs recorded in a recording unit 105 described below in a memory 104. The control unit 103 controls the driving timing of the imaging device 200 and also controls the driving of the digital camera 100 in accordance with the image capturing mode, such as a still image mode, a FullHD mode, or a 4K mode, selected by an operation instruction from a user. In the present embodiment, since the imaging device 200 has the detection mode for selecting and changing the image capturing mode from detection of a change in the subject, the control unit 103 also performs control for permitting the imaging device 200 to operate in the detection mode.

The memory 104 is, for example, a volatile memory, such as an SDRAM. The memory 104 temporarily stores image signals output from the image processing unit 102, data required for processing by the control unit 103, and the like. The recording unit 105 includes, for example, a non-volatile recording medium, such as a semiconductor memory or a magnetic disk, and records and holds image signals (i.e., a captured image) output from the image processing unit 102.

The display unit 106 includes, for example, a display device, such as a liquid crystal display or an organic EL display, and displays a captured image or an image read from the recording unit 105. The display unit 106 also displays an operation screen, a setting screen, and the like for the user to operate and set the digital camera 100.

The operation unit 107 includes, for example, switches for inputting various operations related to image capturing, such as a power button, a shutter button, and buttons for instructing recording start and stop of moving images. The operation unit 107 includes, for example, a menu display button, an enter button, other cursor keys, and a touch screen. When the operation unit 107 receives an operation to these keys and buttons from a user, the control unit 103 controls the components of the digital camera 100 in accordance with the operation content.

Configuration of Imaging Device 200

Figure 2:
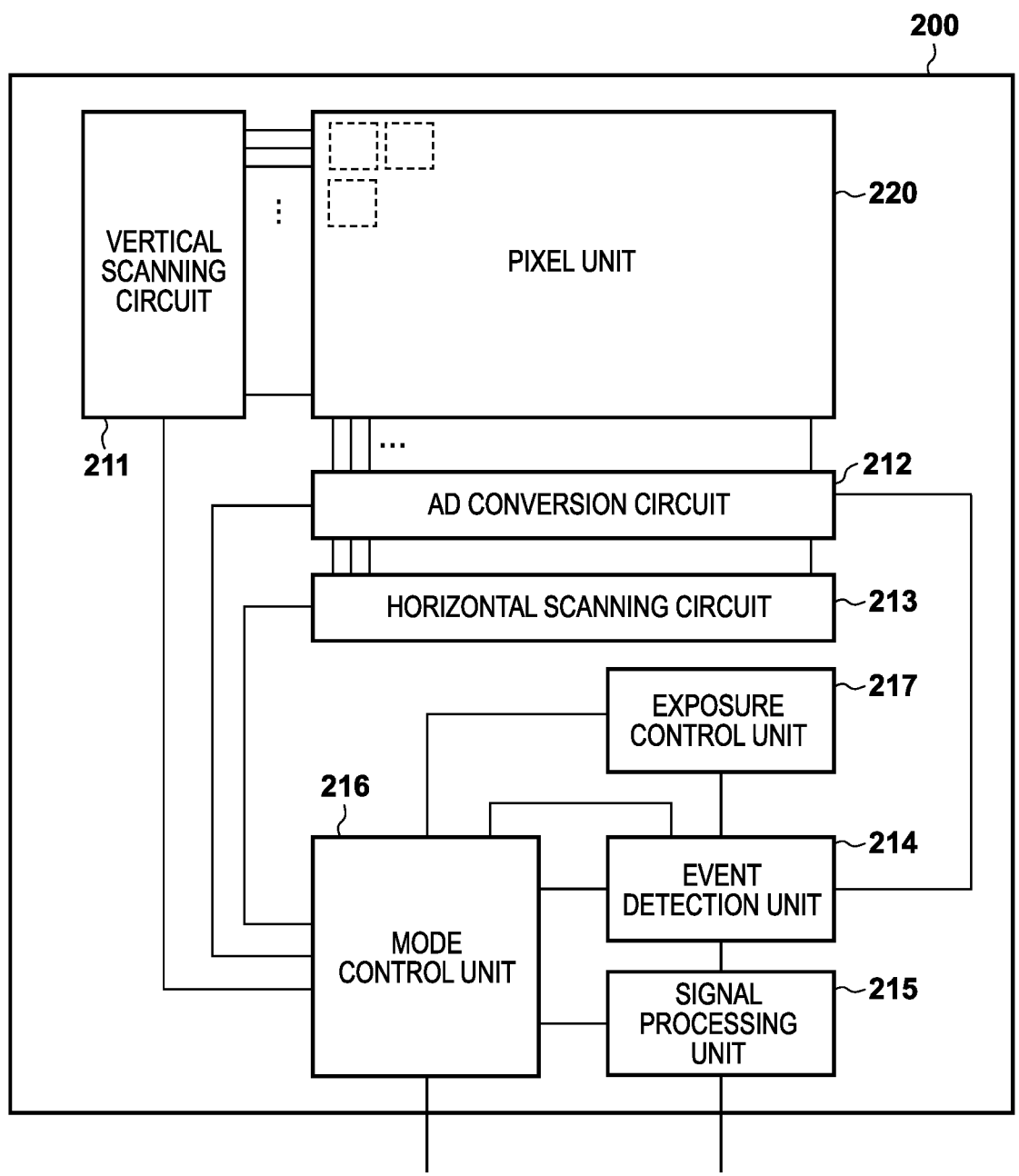
FIG. 2 is a block diagram illustrating a functional configuration example of an imaging device according to a present embodiment.

A functional configuration example of the imaging device 200 according to the present embodiment will now be described in more detail with reference to FIG. 2. The imaging device 200 includes a pixel unit 220 in which a plurality of pixels are arranged in a matrix (i.e., a two-dimensional pattern). The imaging device 200 has a function of outputting image signals composed of pixel signals output in pixel units of the pixel unit 220 and image signals composed of pixel signals obtained by adding signals of multiple pixels in units of pixel blocks (blocks obtained by dividing the plane of the pixel unit 220 in a predetermined manner).

The pixel signals output from the pixel unit 220 are subjected to analog-to-digital conversion by an AD conversion circuit 212 for each pixel column or each block column, which is a pixel block unit as described below. The converted pixel signals are then sequentially transferred to an event detection unit 214 through driving of a horizontal scanning circuit 213.

The event detection unit 214 detects a predetermined event from the input pixel signals or outputs the input pixel signals directly to the signal processing unit 215 in accordance with a control signal from the mode control unit 216 that performs drive mode control of the imaging device 200. That is, the event detection unit 214 functions as a detecting unit for detecting, in the pixel signals input in pixel block units, the blocks in which a subject image has changed among the plurality of pixel blocks. The event detection unit 214 transmits the amount of change in the pixel signals to the mode control unit 216 as a detection result, integrates the pixel signals in pixel block units, and feeds the integrated data to an exposure control unit 217. For pixel signals input in pixel units (i.e., in each pixel column), the event detection unit 214 outputs these pixel signals directly to the signal processing unit 215.

The signal processing unit 215 adds additional information indicating the amount of change in pixel signals, the image capturing mode of an imaging device 200, etc., to at least one of leading end and trailing end of the pixel signals output from the event detection unit 214 and outputs these image signals to an external unit of the imaging device 200. The image signals output to an external unit of the imaging device 200 can be recorded as a captured image in the recording unit 105.

The mode control unit 216 receives signals from the event detection unit 214 in the imaging device 200 or the control unit 103 outside the imaging device 200, and feeds driving timing control signals to the AD conversion circuit 212, the horizontal scanning circuit 213, and a vertical scanning circuit 211. In this way, the mode control unit 216 performs drive control in accordance with each imaging mode of the imaging device 200. When the control unit 103 permits the imaging device 200 to operate in the detection mode (as the operation mode thereof), the mode control unit 216 sets the imaging device 200 to the detection mode and starts driving to add pixel signals in each pixel block.

The vertical scanning circuit 211 selects and drives rows in pixel units or pixel block units via signal lines connected to the respective rows. The exposure control unit 217 calculates an exposure time as exposure control of the imaging device 200 on the basis of the integrated data from the event detection unit 214, and feeds an exposure control signal of the imaging device 200 to the mode control unit 216.

Configuration of Pixel Unit 220

Figure 3:
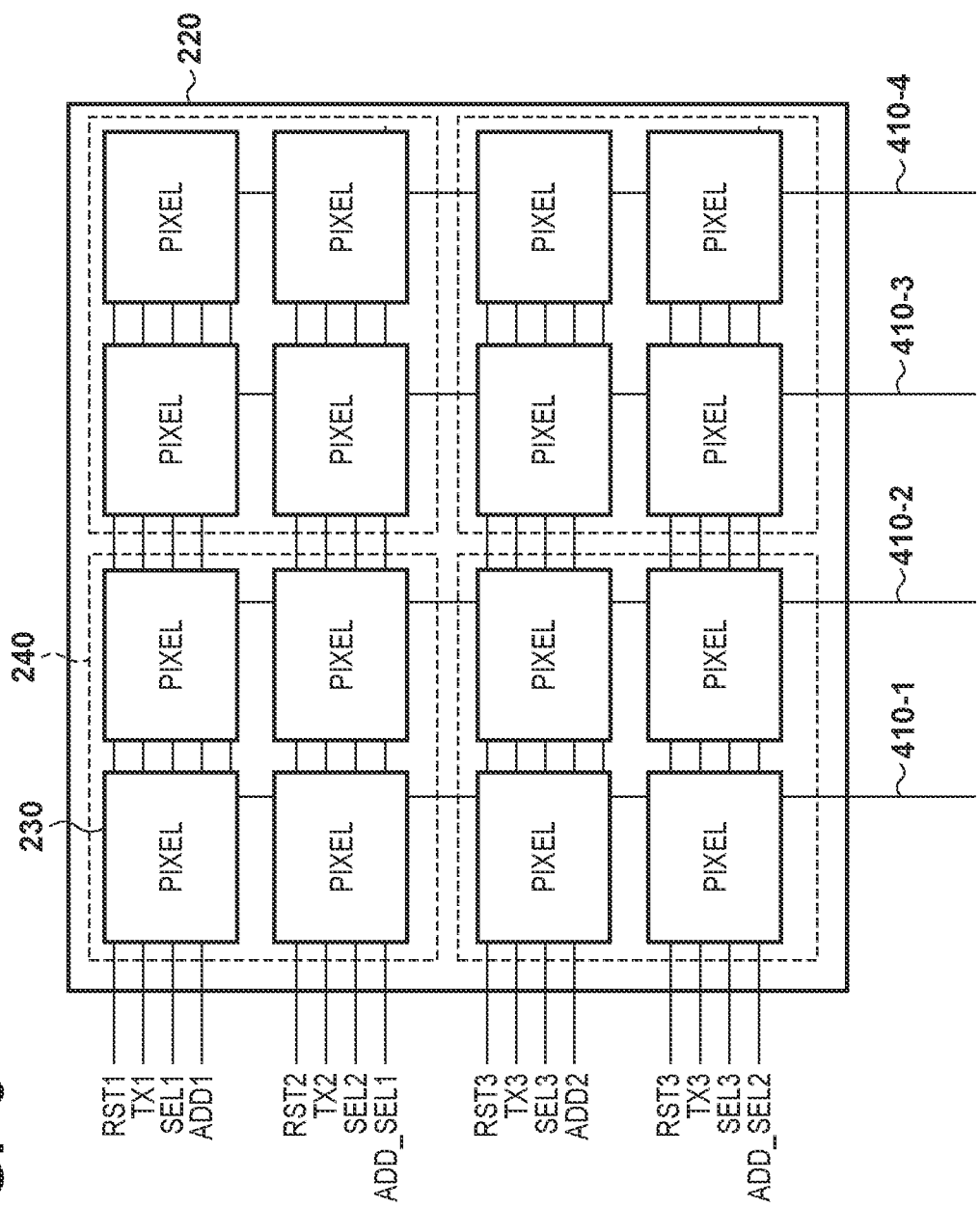
FIG. 3 is a diagram illustrating a configuration example of a pixel unit according to a present embodiment.

A configuration example of the pixel unit 220 according the present embodiment will now be described with reference to FIG. 3. In the pixel unit 220, multiple pixels 230 are arranged in a matrix (i.e., a two-dimensional pattern). In the example of FIG. 3, a pixel block 240 that is an addition unit for event detection includes, for example, 2×2 or four pixels 230. Note that in the present embodiment, for simplicity, an example pixel block 240 consisting of pixels arranged in a 2×2 matrix will be described, but the number of rows and columns and the arrangement are not limited thereto.

The pixel block 240 consisting of 2×2 pixels 230 receives various control signals via a plurality of signal lines wired in the row direction of the block units. That is, reset control signals RST1 and RST2, row selection control signals SEL1 and SEL2, transfer control signals TX1 and TX2, an addition signal ADD1, and a post-addition signal selection control signal ADD_SEL1 are supplied. As illustrated in FIG. 3, the reset control signal, the row selection control signal, and the transfer control signal are fed to each pixel 230. The addition signal and the post-addition signal selection control signal are fed to each pixel block.

In the column direction, one vertical signal line (for example, a vertical signal line 410-1) is wired to each pixel column. An output (i.e., a pixel signal) from each pixel 230 in the same pixel column is input to the AD conversion circuit 212 that is the connection destination via a vertical signal line 410.

The selective feeding of the control signals by the signal lines described above causes the imaging device 200 to sequentially output pixel signals in column units via the respective vertical signal lines 410. When the operation mode is the normal image capturing mode, pixel signals are sequentially output from each of the pixels 230 of the pixel unit 220. In contrast, when the operation mode is the detection mode, the addition switches of the respective FDs described below in the pixel block 240 are operated to output the addition result from a specific pixel.

Figure 4:
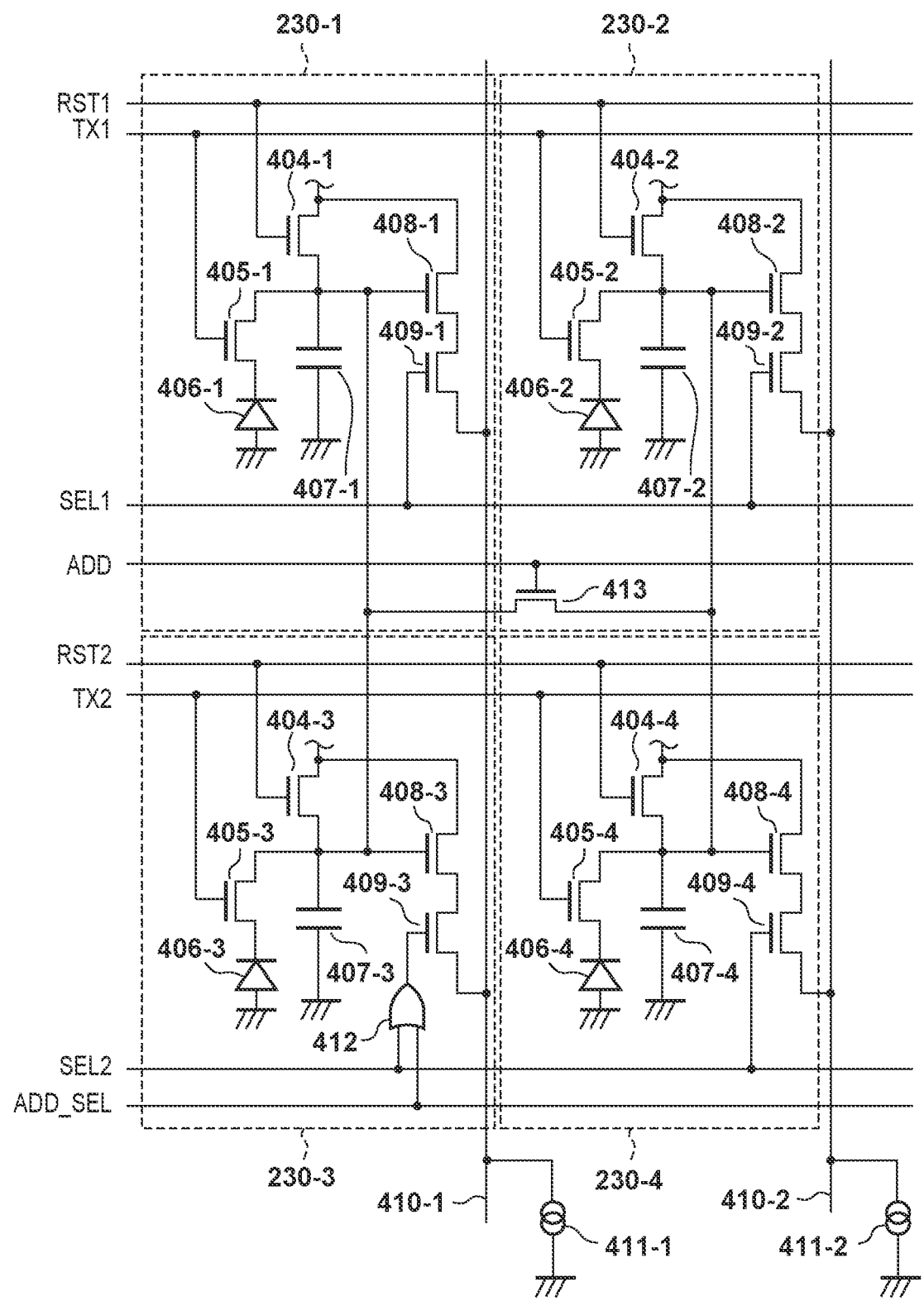
FIG. 4 is a diagram illustrating a configuration example of a pixel block according to a present embodiment.

The configuration of the pixels 230 according the present embodiment will now be described with reference to FIG. 4. FIG. 4 illustrates an example in which four pixels 230 (pixels 230-1 to 230-4) are arranged. Focusing on the pixel 230-1, the charge generated and accumulated in a photodiode 406-1 is transferred to a floating diffusion (FD) 407-1 through control of a transfer switch 405-1 by a transfer control signal TX1. A source follower amplifier 408-1 amplifies a voltage signal based on the charge stored in the FD 407-1 and outputs it as a pixel signal. The output of the source follower amplifier 408-1 is connected to a vertical signal line 410-1 through control of a row selection switch 409-1 by a row selection control signal SEL1 The vertical signal line 410-1 is configured together with a constant current source 411-1 connected to the vertical signal line 410-1.

When an unnecessary charge stored in the FD 407-1 is to be reset, a reset switch 404-1 is controlled by a reset control signal RST1. When the charge of the photodiode 406-1 is to be reset, the transfer control signal TX1 is controlled to control the transfer switch 405-1 together with the reset switch 404-1, to execute the reset. The transfer control signals (e.g., TX1), the reset control signals (e.g., RST1), and the row selection control signals (e.g., SEL1) are fed from the vertical scanning circuit 211 and have control signal values for each row.

When the operation mode of the imaging device 200 is the normal image capturing mode, a signal transferred to the FD 407 (e.g., the FD 407-1) in each pixel 230 is output from each pixel (e.g., 230-1). In contrast, when the operation mode is the detection mode, signals transferred to the FDs (407-1, 407-2, 407-3, 407-4) of four pixels are added and averaged by short-circuiting the FDs by controlling an addition switch 413 by an addition signal ADD.

A post-addition signal selection control signal ADD_SEL is controlled to read the added result to output the added and averaged signal from the pixel 230-3. In this way, the result of the addition by the FDs of the 2×2 pixels is output in the detection mode. However, the range of addition is not limited to 2×2. The addition of signals is not limited to the addition by the FDs, and alternatively, for example, output signals from pixels in multiple rows may be simultaneously output to a vertical output line to added and averaged the output signals, and horizontal addition may be performed by providing an addition circuit in front of the AD conversion circuit.

Configuration of Event Detection Unit 214

Figure 5:
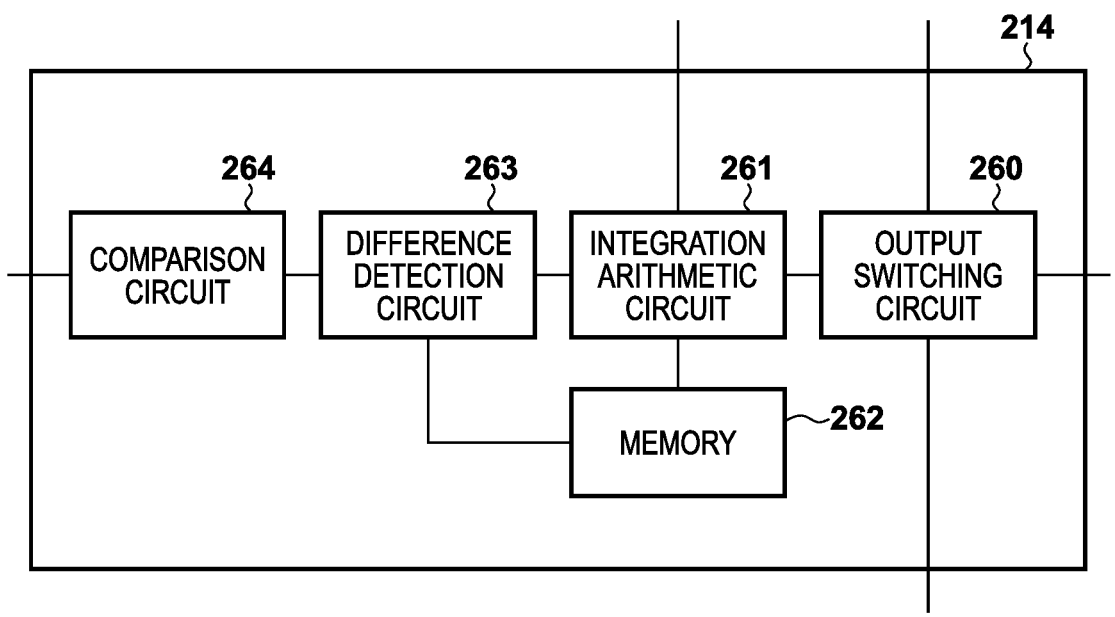
FIG. 5 is a block diagram illustrating a functional configuration example of an event detecting unit according to a present embodiment.

A configuration example of the event detection unit 214 according the present embodiment will now be described with reference to FIG. 5. An output switching circuit 260 is a circuit for switching the pixel output destination to either the inside or the outside of the imaging device 200 in accordance with the operation mode of the imaging device 200.

The output switching circuit 260 receives a control signal from the mode control unit 216, and when the operation mode of the imaging device 200 is the detection mode, sets the output destination of the pixel signals to an integration arithmetic circuit 261 inside the imaging device 200 and causes detection of a change in the subject image. When the operation mode of the imaging device 200 is the normal image capturing mode, the output destination of the pixel signals is set to an external unit of the imaging device 200, and the pixel signals are output from the event detection unit 214 to the signal processing unit 215.

The integration arithmetic circuit 261 receives the output of the pixel signals from the output switching circuit 260, integrates the output values, and feeds the integrated data to the exposure control unit 217. The integration arithmetic circuit 261 outputs the pixel output in pixel block units to a memory 262 for holding the pixel output. The memory 262 stores and holds, as past data, pixel signals in pixel block units acquired in a fixed cycle (for example, every frame) and information indicating the division positions of a two-dimensional matrix in the plane of the imaging device that is the output source of the signals.

A difference detection circuit 263 compares signal values of pixel signals of a pixel block unit read most recently at a same division position with signal values of pixel signals in past data held in the memory 262 to generate difference data. The difference detection circuit 263 feeds the generated difference data to a comparison circuit 264. The comparison circuit 264 compares each piece of the fed difference data with a predetermined threshold value, and transmits the obtained comparison result data to the mode control unit 216.

Figure 6A:
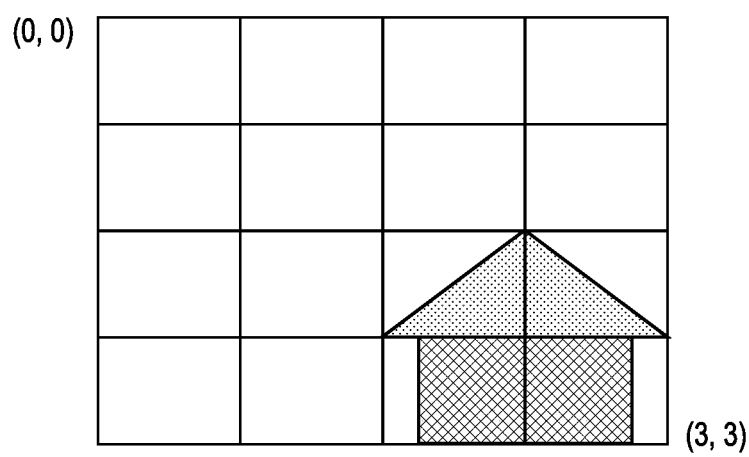
FIG. 6A is a schematic diagram illustrating an example of a subject image on an imaging plane according to a present embodiment.

FIG. 6A illustrates an example of a captured subject image, and in this example, a house that is the subject is positioned across 2×2 blocks at the lower right area of the imaging plane divided into 4×4 pixel blocks. The broken lines in the drawing indicate regions of the pixel blocks. In the following description, the positions of the pixel blocks on a plane will be described by representing the row as number on the left and the column as a number on the right as represented by position 00 at the upper left, position 01 to the right, and so on up to position 33 at the lower right.

Figure 6B:
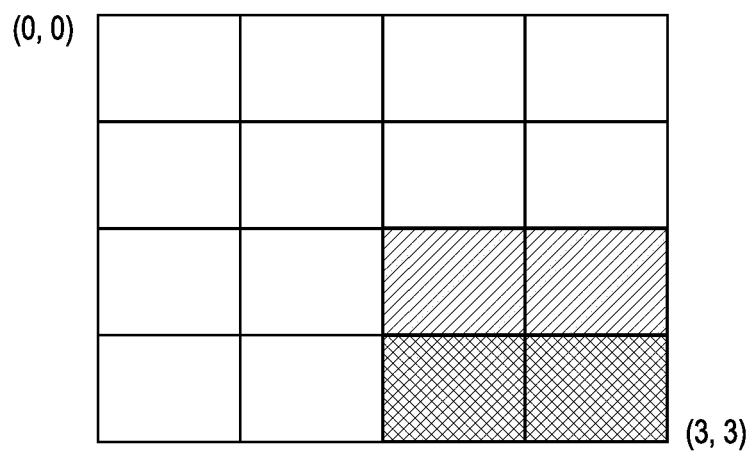
FIG. 6B is a schematic diagram illustrating an example of images output from respective pixel blocks when a subject image is captured in a present embodiment.

FIG. 6B schematically illustrates the output of each pixel block 240 of the pixel unit 220 corresponding to the subject image illustrated in FIG. 6A. The outputs from the pixel blocks 22, 23, 32 and 33 at the positions corresponding to the house portion in FIG. 6A are outputs obtained by pixel addition of the house and its background. Note that the example illustrated in FIG. 6A indicates a case where the background is brighter than the house. Therefore, the outputs of the pixel blocks 22 and 23 have higher signal values than the outputs of the pixel blocks 32 and 33 on the basis of the ratios of area of the house to the area of the background.

Figure 7A:
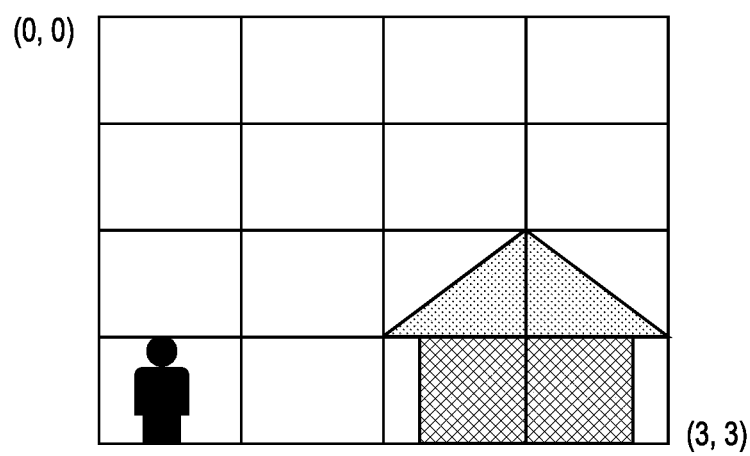
FIG. 7A is a schematic diagram illustrating another example of a subject image on an imaging plane according to a present embodiment.
Figure 8A:
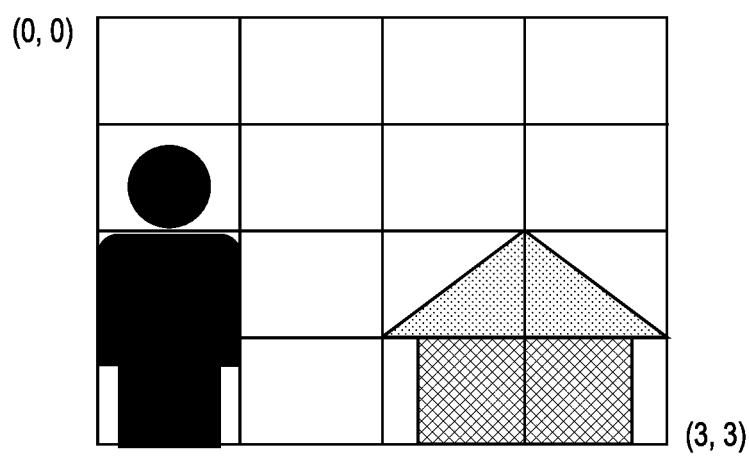
FIG. 8A is a schematic diagram illustrating another example of a subject image on an imaging plane according to a present embodiment.

FIGS. 7A and 8A illustrate examples of subject images, similar to FIG. 6A. In comparison with FIG. 6A, FIG. 7A illustrates an example of a change in the subject image in which a person is added to one block at the lower left, and FIG. 8A illustrate an example of a change in the subject image in which a person is added to three blocks on the left.

Figure 7B:
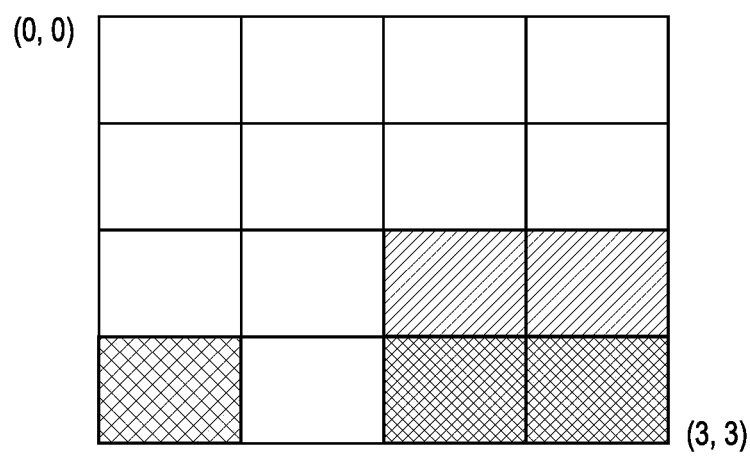
FIG. 7B is a schematic diagram illustrating another example of images output from respective pixel blocks when a subject image is captured in a present embodiment.
Figure 8B:
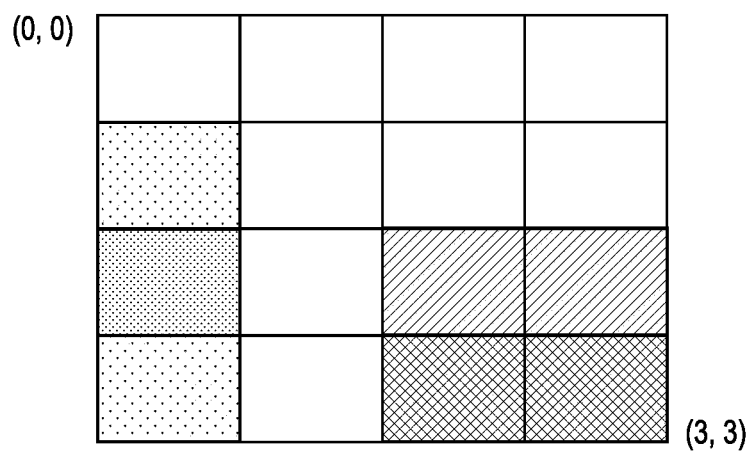
FIG. 8B is a schematic diagram illustrating another example of images output from respective pixel blocks when a subject image is captured in a present embodiment.

FIG. 7B schematically illustrates the outputs of the respective pixel blocks corresponding to the subject image in FIG. 7A, and FIG. 8B schematically illustrates the outputs of the respective pixel blocks corresponding to the subject image in FIG. 8A. For example, a case is considered in which the subject image illustrated in FIG. 6A changes to the subject image illustrated in FIG. 7A. The difference detection circuit 263 calculates difference data at the same division position for each pixel block from the pixel signals of the pixel block units illustrated in FIG. 6B held in the memory 262 as past data and the pixel signals of the pixel block units illustrated in FIG. 7B read most recently.

The comparison circuit 264 then compares the calculated difference data with a predetermined threshold value. That is, the comparison 263 determines whether a change in the subject image has occurred on the basis of the calculated difference data and the predetermined threshold value (the threshold value will be described below). As a result, in the example illustrated in FIGS. 7A and 7B, a change in the subject image is detected from the difference data for one pixel block 30.

When a change in the subject image is detected in one pixel block, the mode control unit 216 changes and selects drive control for an image capturing mode for a detailed image. For example, in the present embodiment, the mode control unit 216 selects the 4K mode as the image capturing mode.

Similarly, when a change in the subject image illustrated in FIG. 8A is detected, a change in the subject image is detected in the three pixel blocks 10, 20, and 30 from the difference data from the difference detection circuit 263 on the basis of the pixel signals in units of the pixel blocks illustrated in FIGS. 6B and 8B. When a change in the subject image is detected in more than two pixel blocks, the mode control unit 216 changes and selects drive control for an image capturing mode for low-resolution and low power consumption. For example, in the present embodiment, the mode control unit 216 selects the FullHD mode as the image capturing mode. In this way, the mode control unit 216 functions as a determining unit for determining the image capturing mode. It also functions as a controlling unit for performing image capturing in the image capturing mode determined as described above and outputting a captured image.

Figure 9:
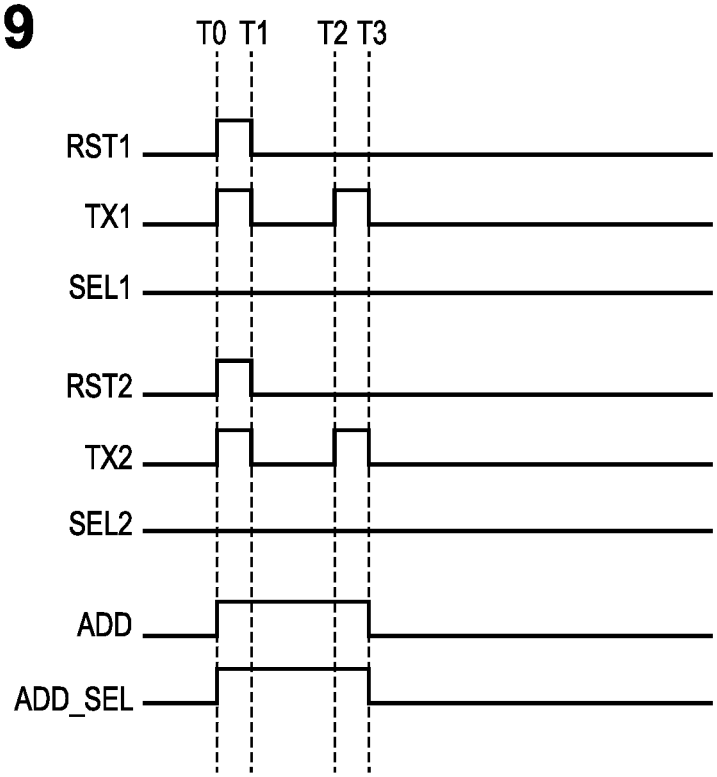
FIG. 9 is a timing chart illustrating an operation example of an imaging device according to a present embodiment in a detection mode.

A reading operation of pixel signals in pixel block units during operation in the detection mode will now be explained with reference to FIG. 9.

It is presumed that at timing T0, an event is detected (for example, the control unit 103 permits the imaging device 200 to operate in the detection mode), and the detection mode is set. The vertical scanning circuit 211 sets the addition signals ADD and ADD_SEL to a high level so that the pixel signals obtained by adding and averaging in block units are output to the vertical signal line.

At the same timing T0, the vertical scanning circuit 211 controls the reset control signals RST1 and RST2 and the transfer control signals TX1 and TX2 to a high level. This resets the FDs 407-1 to 407-4 in a connected state by the addition signal ADD and the photodiodes 406-1 to 406-4 in the blocks to the power supply potential.

At timing T1, the reset control signals RST1 and RST2 and the transfer control signals TX1 and TX2 return to a low level, and exposure of the pixels is started in the block units of the first row. At timing T2, after a certain exposure time has elapsed, the vertical scanning circuit 211 controls the transfer control signals TX1 and TX2 corresponding to the block units of the first row to a high level to turn on the transfer switches 405-1 to 405-4. This transfers the charges stored in the respective photodiodes 406-1 to 406-4 to the floating diffusions (FDs). This completes the exposure of the block units in which the charges are combined.

The charges of block units transferred to the FDs are amplified as voltage signals by the source follower amplifier 408-3 and output as pixel outputs from the vertical output lines. The pixel outputs output to the vertical output lines are converted into digital signals by the AD conversion circuit. Similarly, at and after timing T3, exposure and reading are sequentially performed in block row units, thereby completing the reading of all block rows. The reading of all the block rows is executed multiple times in accordance with the vertical synchronization signals.

Figure 10:
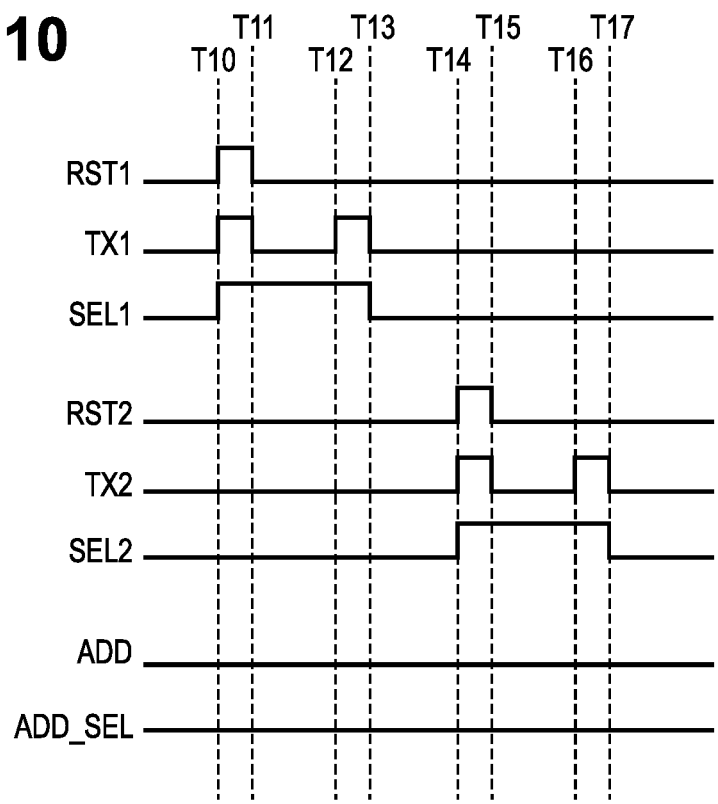
FIG. 10 is a timing chart illustrating an operation example of an imaging device according to a present embodiment in a 4K mode.

A reading operation of pixel signals in pixel units during operation in the 4K mode will now be explained with reference to FIG. 10.

It is presumed that, at timing T10, an event is detected (for example, the event detection unit 214 detects a change in the subject image illustrated in FIG. 7B), and the 4K mode is set as the image capturing mode.

The vertical scanning circuit 211 controls the row selection control signal SEL_1 to a high level and the reset control signal RST1 to a high level during a predetermined pulse period in order to read the pixel signals of the first pixel row.

At the same timing T10, the vertical scanning circuit 211 controls the reset control signal RST1 and the transfer control signal TX1 to a high level. This resets the FDs 407-1 and 407-2 and the photodiodes 406-1 and 406-2 of the pixels in the first row to the power supply potential. Since the FD 407-3 is connected to the FD 407-1, and the FD 407-4 is connected to the FD 407-2, they are reset in the same manner. Since the vertical scanning circuit 211 does not read pixel signals in block units in the 4K mode, the addition signals ADD and ADD_SEL are not set to a high level.

At timing T11, under the control of the vertical scanning circuit 211, the reset control signal RST1 and the transfer control signal TX1 return to a low level, and exposure is started for the first pixel row. At timing T12, after a certain exposure time has elapsed, the vertical scanning circuit 211 controls the transfer control signal TX1 to a high level to turn on the transfer switches 405-1 and 405-2. This transfers the charges stored in the photodiode 406-1 to the FDs 407-1 and 407-3 and the charges stored in the photodiode 406-2 to the FDs 407-2 and 407-4. Exposure of the pixel units then ends.

The charges transferred to the FDs are amplified as voltage signals by the source follower amplifiers 408-1 and 408-2 that are the connection destinations and are output as pixel signals from the vertical output lines of the columns. The pixel signals output to the vertical output lines are read by the AD conversion circuits of the columns.

In the next timings T14 to T17, a signal reading operation of the pixels in the second row is performed. In the reading of the signals, the row selection control signal SEL_2, the reset control signal RST2, and the transfer control signal TX2 corresponding to the pixels in the second row are driven and controlled in the same manner as the same signals of the pixels in the first row. This transfers the charges stored in the photodiode 406-3 to the FDs 407-3 and 407-1 and the charges stored in the photodiode 406-4 to the FDs 407-4 and 407-2. Exposure in the pixel units then ends.

The charges transferred to the FDs are amplified as voltage signals by the source follower amplifiers 408-3 and 408-4 that are connection destinations and are output as pixel signals from the vertical output lines of the columns.

Similarly, for the subsequent pixel rows, exposure and reading are performed in pixel row units, thereby completing the reading of all rows. The reading of all the rows is executed multiple times in accordance with the vertical synchronization signals.

Figure 11:
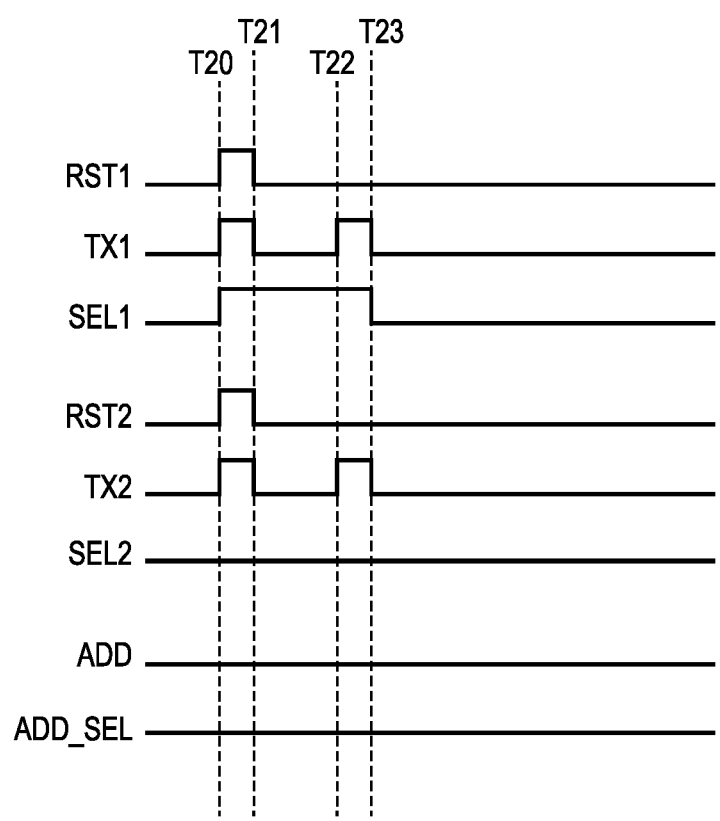
FIG. 11 is a timing chart illustrating an operation example of an imaging device according to a present embodiment in a FullHD mode.

A reading operation of pixel signals in pixel units during operation in the FullHD mode will now be explained with reference to FIG. 11.

In the FullHD mode according to the present embodiment, the imaging device 200 reads the pixel signals obtained by adding the pixels in every two rows. In comparison with the 4K mode in which pixel signals are read in units of one pixel, the number of pixels to be output is reduced, so that the resolution is reduced. However, since the reading period and the time required for data processing are reduced, power consumption can be reduced.

It is presumed that, at timing T20, an event is detected (for example, the event detection unit 214 detects a change in the subject image illustrated in FIG. 8B), and the FullHD mode is set as the image capturing mode.

The vertical scanning circuit 211 controls the reset control signals RST1 and RST2 and the row selection control signal SEL_1 corresponding to pixels of two rows that correspond to the first row in the FullHD mode to a high level during a predetermined pulse period. At the same timing T20, the vertical scanning circuit 211 controls the transfer control signals TX1 and Tx2 to a high level. This resets the FDs 407-1, 407-2, 407-3, and 407-4, and the photodiodes 406-1, 406-2, 406-3, and 406-4 of two-pixel the pixels of the two rows that correspond to one row in the FullHD mode to a power supply potential. Since the vertical scanning circuit 211 does not read pixel signals in block units in the FullHD mode, the addition signals ADD and ADD_SEL are not set to a high level.

At timing T21, under the control of the vertical scanning circuit 211, the reset control signals RST1 and RST2 and the transfer control signals TX1 and TX2 return to a low level, and the exposure is started for the pixels of the two rows corresponding to the first row in FullHD mode. At timing T22, after a certain exposure time has elapsed, the vertical scanning circuit 211 controls the transfer control signals TX1 and TX2 to a high level to turn on the transfer switches 405-1, 405-2, 405-3, and 405-4. This transfers the charges stored in the photodiodes 406-1, 406-2, 406-3, and 406-4 to the corresponding FDs, and the exposure of the pixels in the two rows corresponding to the first row in FullHD mode ends.

The charges transferred to the FDs are amplified as voltage signals by the source follower amplifiers 408-1 and 408-2 in column units and are output as pixel signals from the vertical output lines of the columns. The pixel signals output to the vertical output lines are read by the AD conversion circuits. Similarly, at and after timing T23, exposure and reading are sequentially performed for pixels in units of two rows corresponding to one row in the FullHD mode, thereby completing reading of all rows. The reading of all the rows is executed multiple times in accordance with the vertical synchronization signals.

Series of Operations Involving Image Capturing Mode Control of Imaging Device

Figure 12:
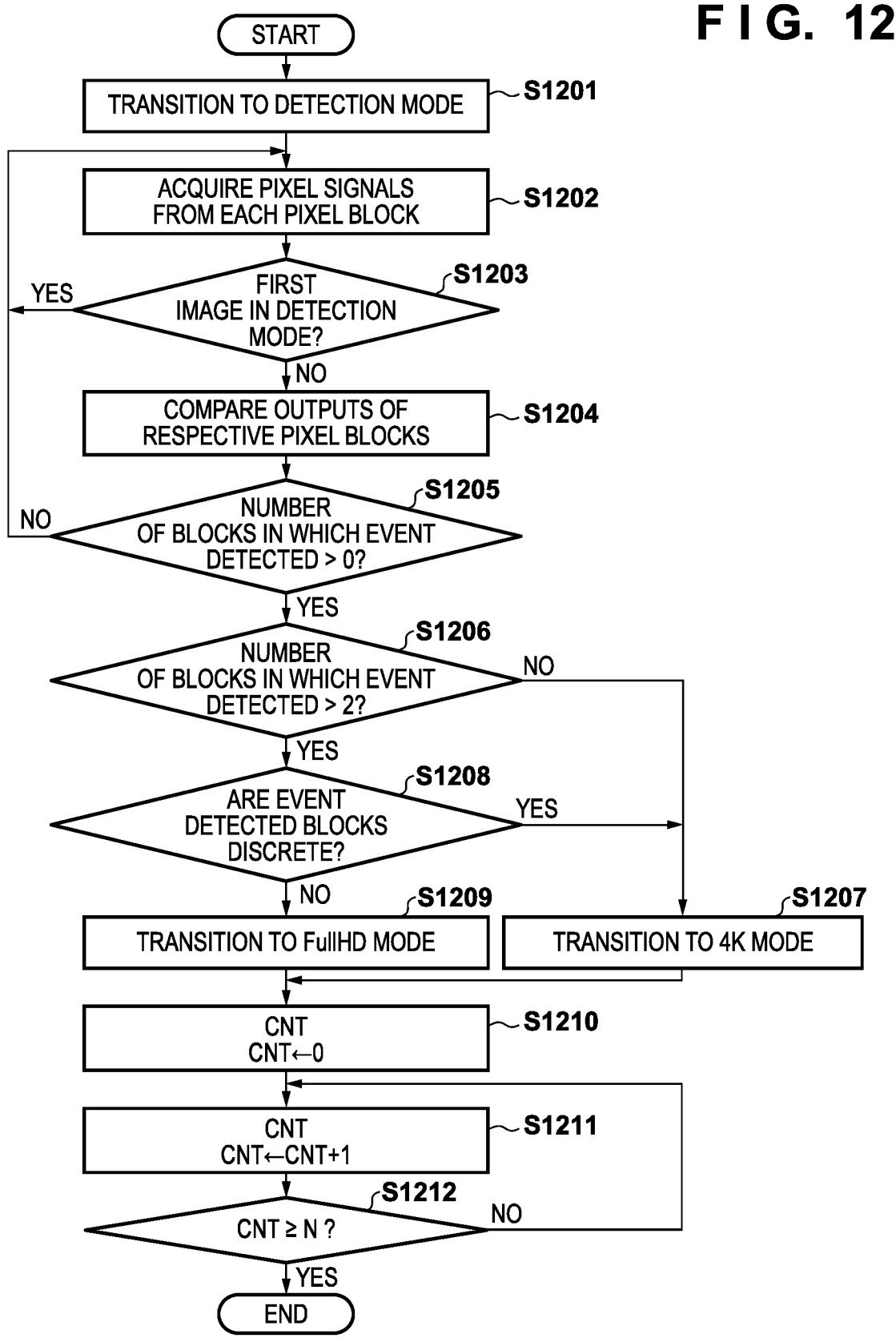
FIG. 12 is a flowchart illustrating a series of operations involving image capturing mode control of an imaging device according to a present embodiment.

A series of operations involving image capturing mode control of the imaging device 200 will now be explained with reference to FIG. 12. In this processing, the operation of the control unit 103 is realized by the control unit 103 loading and executing programs stored in the recording unit 105 in the memory 104. Unless otherwise mentioned, the operation of each step is executed in the imaging device 200.

In the following explanation, operations executed by the components of the imaging device 200, such as the event detection unit 214, will be collectively explained as operations performed by the imaging device 200. Note that this processing starts, for example, when a direct or indirect predetermined operation instruction for changing the operation mode of the imaging device 200 to the detection mode is received via the operation unit 107 of the digital camera 100.

In step S1201, the control unit 103 controls the imaging device 200 to operate in the detection mode, and transitions the operation mode of the imaging device 200 to the detection mode. The imaging device 200 sets the operation mode of the imaging device 200 to the detection mode in response to receiving an instruction to operate in the detection mode from the control unit 103, and outputs pixel signals obtained through addition in each pixel block in the imaging device 200.

In step S1202, the imaging device 200 acquires the pixel signals obtained through addition in each pixel block from the pixel unit 220. The imaging device 200 temporarily stores the acquired pixel signals in the memory 262.

In step S1203, the imaging device 200 determines whether the acquired pixel signals from each pixel block are signals of the first image acquired after the start of the operation in the detection mode. If the imaging device 200 determines that the pixel signals are signals of the first image acquired after the start of operation, the processing returns to step S1202 because the difference from past data for detecting a change in the subject image cannot be obtained. If the imaging device 200 determines that the pixel signals to be processed are not signals of the first image acquired after the start of operation (in which case, past data exists), the processing proceeds to step S1204.

In step S1204, the imaging device 200 compares the pixel signals (of the n-th image) acquired in step S1202 with the pixel signals (of the (n−1)-th image) in the past data stored in the memory 262 to generate difference data for the pixel signals of each pixel block. At this time, the imaging device 200 determines whether or not the obtained difference data is equal to or greater than a predetermined threshold, and counts the number of pixel blocks corresponding to the difference data that is equal to or greater than the predetermined threshold.

That is, the imaging device 200 determines, for each pixel block, whether there is a block in which an event (i.e., a change in the subject image) has been detected, and counts the number of blocks in which an event has been detected. In the above example, the case in which the predetermined threshold value for determining the difference data is fixed is described as an example, but alternatively the predetermined threshold value may be changed in accordance with the subject type, the image capturing condition, or the user operation.

For example, when there is a change in a monitoring target, whose change should not be detected as a change in the subject, due to small motions, the predetermined threshold value can be increased to reduce erroneous detection of a change in the subject image (the detection accuracy can be adjusted).

In step S1205, the imaging device 200 determines the number of pixel blocks of which the corresponding difference data is equal to or greater than the predetermined threshold value (i.e., in which an event is detected). If the imaging device 200 determines that no pixel block in which the corresponding difference data is equal to or greater than the predetermined threshold value is counted (i.e., the number of pixel blocks is zero), the processing returns to step S1202 because no event is detected. In such a case, the above-described operation up to step S1204 for detecting a change in the subject image is repeated. In contrast, if the count is greater than zero (that is, if an event is detected), the imaging device 200 determines that an event has been detected, and processing proceeds to step S1206.

In step S1206, the imaging device 200 determines whether the count number obtained in step S1204 exceeds a predetermined count threshold value (e.g., 2). If the imaging device 200 determines that the count number is equal to or smaller than the predetermined count threshold value, the processing proceeds to step S1207 because the area of the changed region is small, and the change in the target subject image is also small. In contrast, if the imaging device 200 determines that the count number exceeds the predetermined count threshold value, the processing proceeds to step S1208.

Note that in the example of the processing of step S1206, a case in which the count threshold value is 2 is described as an example, but the count number is not limited to 2, and may be varied in accordance with the image capturing condition or the intention of the user.

In step S1207, the imaging device 200 changes the operation mode of the imaging device 200 from the detection mode to the normal image capturing mode, and further changes the image capturing mode to an image capturing mode capable of acquiring a detailed image. For example, the image capturing mode transitions to the 4K mode in which pixel signals are read in units of one pixel without pixel addition. As described above, the 4K mode is an image capturing mode for outputting an image having more pixels than that of an image output in the image capturing mode (the FullHD mode) to be transitioned to in step S1209.

In step S1208, the imaging device 200 determines the degree of dispersion of the pixel blocks in which an event has been detected. If the imaging device 200 determines that the pixel blocks in which an event has detected is discrete in the plane (for example, there is a block that is not adjacent to others), it is presumed that a plurality of subject images exist, and the processing proceed to step S1207 for acquiring a detailed image. In other words, in this step, the imaging device 200 determines whether the area of the changed region is large and thus the target subject is dispersed or the subject image is large. In the case of the former, the imaging device 200 controls the image capturing mode so as to acquire a detailed image. In contrast, if the imaging device 200 determines that the pixel blocks in which an event has been detected is not discrete, it is presumed that the size of the target subject image is large, and the processing proceeds to step S1209.

In step S1209, the imaging device 200 changes the operation mode of the imaging device 200 from the detection mode to the normal image capturing mode, and further changes the image capturing mode to the low-resolution, low-power consumption FullHD mode in which the number of read pixels is smaller than that in the 4K mode. If the imaging device 200 determines that the size of the target subject in the screen is large, there is a possibility that the subject is positioned in the near field of the digital camera, and thus it can be determined that low resolution will suffice for the image to be used to recognize the subject.

In step S1210, when the image capturing operation (i.e., recoding of captured images in the recording unit 105) is started after transitioning to the relevant image capturing mode, the imaging device 200 resets the count value CNT for counting image data in the image capturing mode to zero. In step S1211, the imaging device 200 increments the count value CNT each time image data is acquired, and in step S1212, determines whether the count value CNT is equal to or greater than a predetermined number (N).

If the imaging device 200 determines that the counter value CNT is smaller than N, the processing returns to step S1211, and the image capturing mode is continued by repeating the processing after step S1211. In contrast, if the imaging device 200 determines that the counter value CNT is equal to or greater than N, the series of processing ends. Note that if the imaging device 200 determines that the counter value CNT is equal to or greater than N, the operation mode may be returned to the detection mode to further repeat the processing. In such a case, the processing returns to step S1201.

As described above, in the present embodiment, the imaging device 200 in the detection mode detects a change in a subject image by using pixel signals obtained by pixel addition of each pixel block. In this way, it is possible to reduce the operation power consumption of the imaging device 200 until an event is detected. In addition, the imaging device 200 determines an appropriate image capturing mode on the basis of the blocks in which a change in the subject image is detected.

For example, an image capturing mode for a detailed image or an image capturing mode for a low-resolution image is selected in accordance with the blocks in which a change in a subject image has been detected. In this way, it is possible to select a reading method of pixels that can achieve necessary and sufficient resolution for image capturing of a subject, and thus it is possible to obtain a satisfactory captured image. Furthermore, by allowing selection of an image capturing mode in which pixel addition is performed so as to obtain a low-resolution image, power consumption can be reduced through selection of the image capturing mode. In other words, it is possible to reduce power consumption in an operation after detection of a change in a subject image in an imaging apparatus performs image capturing in accordance with the detection of a change in the subject image.

Note that in the above example, the FullHD mode has been described as a mode in which the number of output pixels is reduced by pixel signal addition in two adjacent rows sharing an FD, but the FullHD mode is not limited thereto, and alternatively the number of pixel signals to be added may be changed within the range of pixel signal addition in the column direction or the required resolution.

The above-described embodiments may be applied to a case in which color filters or the like are disposed in the pixel groups of the imaging device 200, and pixel signals are output by color. In such a case, pixel signal addition of the same color may be performed by row or column in which output pixels of the same color are disposed.

In addition to reducing the number of pixel signals to be output by pixel signal addition, the pixel row or column to be read may be thinned before reading. In the example described above, although an example has been described in which a change in a subject image is detected by using pixel signals of each pixel block subjected to pixel addition in the detection mode, the pixel signal addition may be performed after the pixels in the pixel block are thinned at predetermined intervals.

In the example described above, the 4K image capturing mode is described as an example of an image capturing mode using a detailed image, and the FullHD mode is described as an example of an image capturing mode with low resolution and low power consumption. However, the image capturing modes are not limited thereto, and two or more image capturing mode for capturing images having different numbers of pixels may be selected among the image capturing modes settable in the digital camera 100.

Furthermore, in the example described above, although the image capturing mode is selected and switched in accordance with a change in a subject image from the viewpoint of resolution and low power consumption, the image capturing mode may be selected and switched together with framerate in accordance with priority including the followability of the image capturing of the subject. For example, in image capturing in the FullHD mode, there is a possibility that the subject image is large and is in the near field of the digital camera. For this reason, the framerate of image capturing of the imaging device 200 may be set higher for image capturing because it can be presumed that there is a possibility of the moving speed on the screen being high. In such a case, the degree of priority may be changed in accordance with the power state of the digital camera or the user's choice.

Example of Implementing Imaging Device by Stacked Structure

The imaging device 200 described above may be implemented by an imaging device having a stacked structure as illustrated in FIGS. 13A to 13C. The imaging device 200 may include a semiconductor substrate 1201 and a semiconductor substrate 1202 illustrated in FIGS. 13B and 13C. The semiconductor substrates 1201 and 1202 are sealed in a superposed state and are modularized (integrated). That is, as illustrated in FIG. 13C, the semiconductor substrates 1201 and 1202 form a multilayer structure (stacked structure). A circuit formed on the semiconductor substrate 1201 and a circuit formed on the semiconductor substrate 1202 are connected to each other through a via or the like.

In this way, the imaging device 200 may be a module (also referred to as a large-scale integration (LSI) chip) in which the first semiconductor substrate 1201 and the second semiconductor substrate 1202 are integrated to form a multilayer structure. The first semiconductor substrate 1201 and the second semiconductor substrate 1202 forming such a multilayer structure in the module can enable the imaging device 200 to implement a larger scale circuit without increasing the size of the semiconductor substrates. That is, the imaging device 200 can implement a larger scale circuit while suppressing an increase in cost.

For example, each component included in the imaging device 200 is formed on one of the first semiconductor substrate 1201 and the second semiconductor substrate 1202 as follows. For example, as illustrated in FIG. 13A, the pixel unit 220, the vertical scanning circuit 211, the AD conversion circuit 212, and the horizontal scanning circuit 213 are formed on the first semiconductor substrate 1201. The event detection unit 214, the signal processing unit 215, the mode control unit 216, and the exposure control unit 217 are formed on the second semiconductor substrate 1202. Note that the arrangement illustrated in FIG. 13A is a mere example, and the arrangement of the components on the first semiconductor substrate 1201 and the second semiconductor substrate 1202 is not limited thereto.

According to the present invention, an imaging apparatus that performs image capturing in response to detection of a change in a subject image can reduce power consumption during an operation after detection of the change in the subject image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
a detecting unit that acquires pixel signals for each of a plurality of regions obtained by dividing an imaging plane having a plurality of pixels arranged in a two-dimensional pattern, and detects a region among the plurality of regions in which a subject image has changed; and
a controller that controls to perform image capturing in either a first image capturing mode for outputting an image signal with a first resolution from an entire imaging area on the imaging plane or a second image capturing mode for outputting an image signal with a second resolution lower than the first resolution from the entire imaging area on the imaging plane, in response to selection of one of the first and second image capturing modes based on (i) detection of a number of regions in which the subject image has changed, and (ii) determining that the number of regions in which the subject image has changed is greater than a non-zero predetermined count threshold,
wherein when, among the plurality of regions, the number of regions in which the subject image has changed is less than or equal to the non-zero predetermined count threshold, the controller controls to perform image capturing in the first image capturing mode, and when, among the plurality of regions, the number of regions in which the subject image has changed is more than the non-zero predetermined count threshold, the controller controls to perform image capturing in the second image capturing mode, and
wherein when the number of regions in which the subject image has changed is more than the non-zero predetermined count threshold, the controller determines whether any of the regions among the regions in which the subject image has changed is a non-adjacent region, and when a non-adjacent region exists among the regions in which the subject image has changed, the controller controls to perform image capturing in the first image capturing mode.

2. The imaging apparatus according to claim 1, wherein the first image capturing mode is an image capturing mode that outputs an image constituted by pixel signals that have not been subjected to addition or thinning, and the second image capturing mode is an image capturing mode that outputs an image constituted by pixel signals of a reduced number of pixels due to addition or thinning of pixel signals.

3. The imaging apparatus according to claim 1, wherein the detecting unit detects the region in which the subject image has changed among the plurality of regions by extracting pixel signals for each of the plurality of regions at a predetermined cycle and determining whether a change in the pixel signals between cycles exceeds a predetermined threshold value for change.

4. The imaging apparatus according to claim 3, wherein the predetermined threshold count value for change is variable in accordance with an instruction from a unit external to the imaging apparatus.

5. The imaging apparatus according to claim 1, wherein for each of the plurality of regions obtained by dividing the imaging plane, the detecting unit acquires a number of pixel signals less than the number of pixels in the region, and detects a region in which the subject image has changed among the plurality of regions.

6. The imaging apparatus according to claim 1, wherein a number of pixel signals less than the number of pixels in each of the plurality of regions is obtained by adding the pixel signals from the pixels in the region or thinning the pixel signals of a predetermined pixel column or a predetermined pixel row from the pixel signals of the pixels of the region.

7. The imaging apparatus according to claim 1, further comprising:
an imaging device formed by a stacked structure including a first semiconductor substrate and a second semiconductor substrate.

8. The imaging apparatus according to claim 7, wherein the first semiconductor substrate includes pixels arranged in the two-dimensional pattern, and the second semiconductor substrate includes the detecting unit and the controller.

9. The imaging apparatus according to claim 1, further comprising:
a recording unit that records the captured image.

10. A control method of an imaging apparatus comprising:
acquiring pixel signals for each of a plurality of regions obtained by dividing an imaging plane having a plurality of pixels arranged in a two-dimensional pattern, and detecting a region among the plurality of regions in which a subject image has changed; and
performing control to perform image capturing in either a first image capturing mode for outputting an image signal with a first resolution from an entire imaging area on the imaging plane or a second image capturing mode for outputting an image signal with a second resolution lower than the first resolution from the entire imaging area on the imaging plane, in response to selection of one of the first and second image capturing modes based on (i) detection of a number of regions in which the subject image has changed, and (ii) determining that the number of regions in which the subject image has changed is greater than a non-zero predetermined count threshold,
wherein the performing control includes:
when, among the plurality of regions, the number of regions in which the subject image has changed is less than or equal to the non-zero predetermined count threshold, performing control to perform image capturing in the first image capturing mode, and
when, among the plurality of regions, the number of regions in which the subject image has changed is more than the non-zero predetermined count threshold, performing control to perform image capturing in the second image capturing mode, and
wherein when the number of regions in which the subject image has changed is more than the non-zero predetermined count threshold, the performing control includes determining whether any of the regions among the regions in which the subject image has changed is a non-adjacent region, and when a non-adjacent region exists among the regions in which the subject image has changed, performing control to perform image capturing in the first image capturing mode.

* * * * *